June 9, 1964 D. W. HAMM 3,136,559
PISTON RING SPACER
Filed Jan. 25, 1961 3 Sheets-Sheet 2
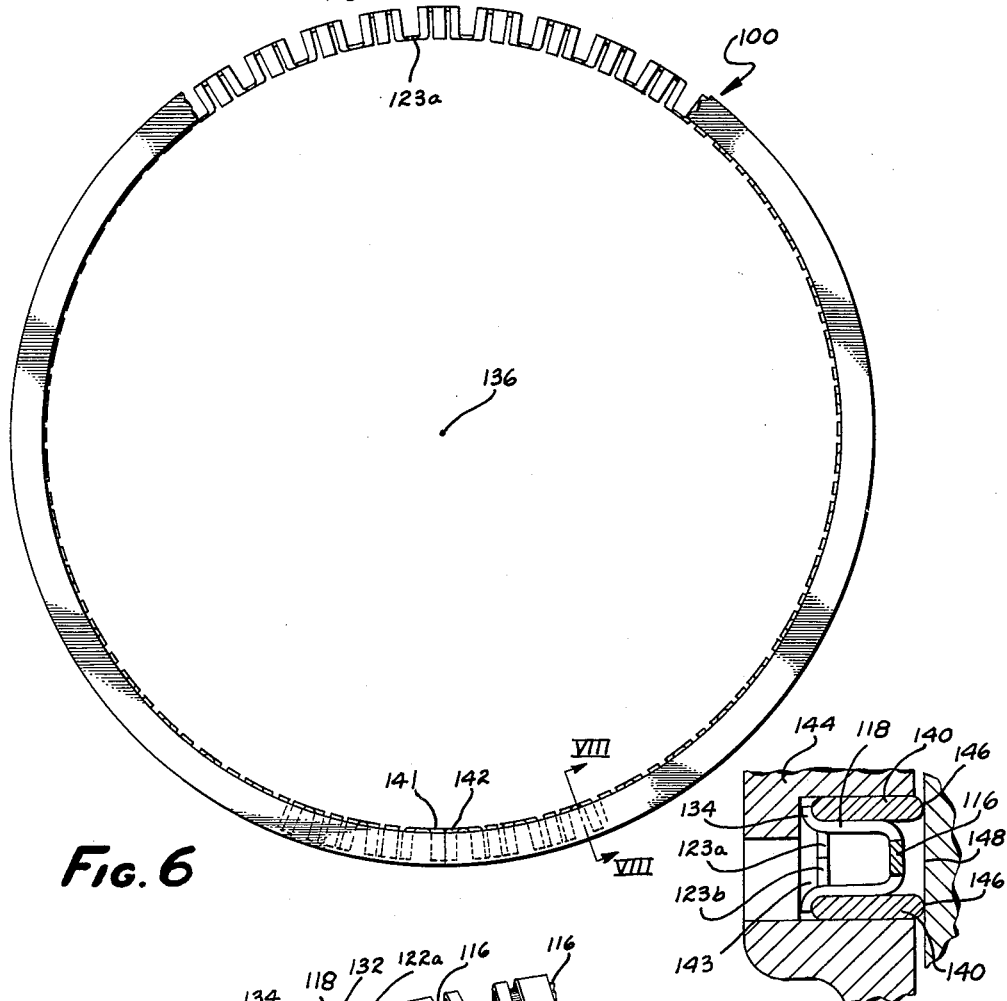
Fig. 5
Fig. 6
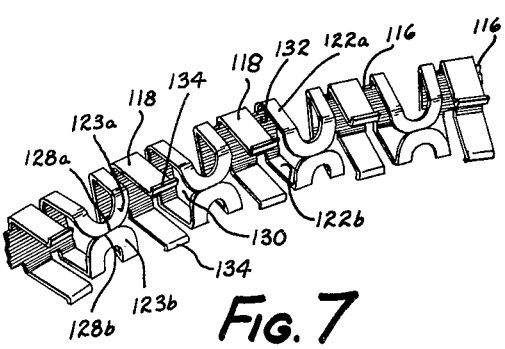
Fig. 7
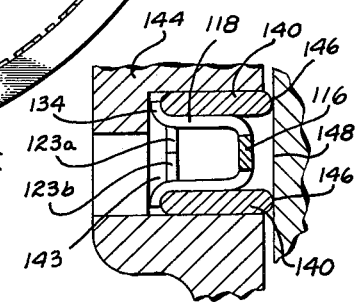
Fig. 8
INVENTOR.
DOUGLAS W. HAMM
BY
ATTORNEYS

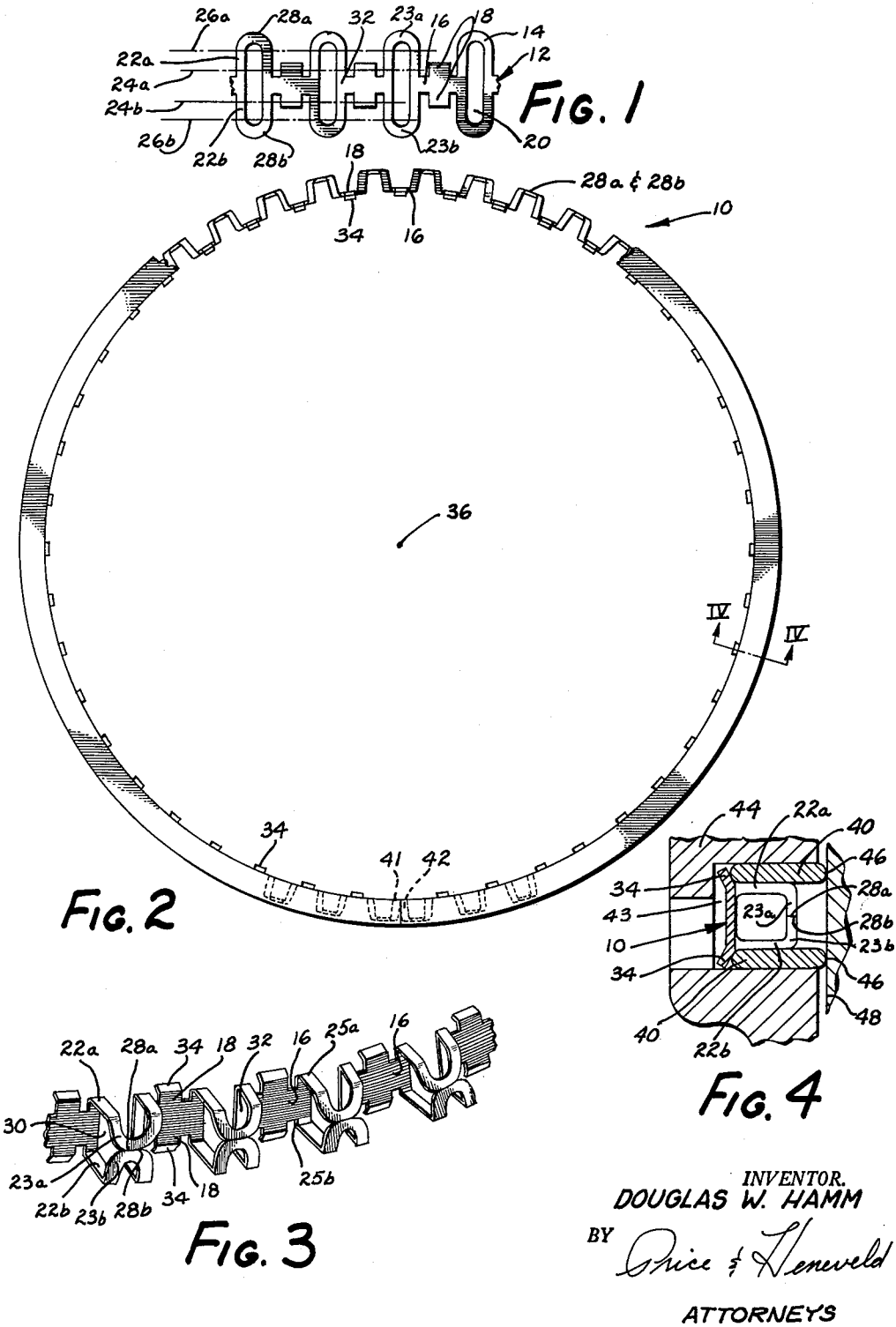

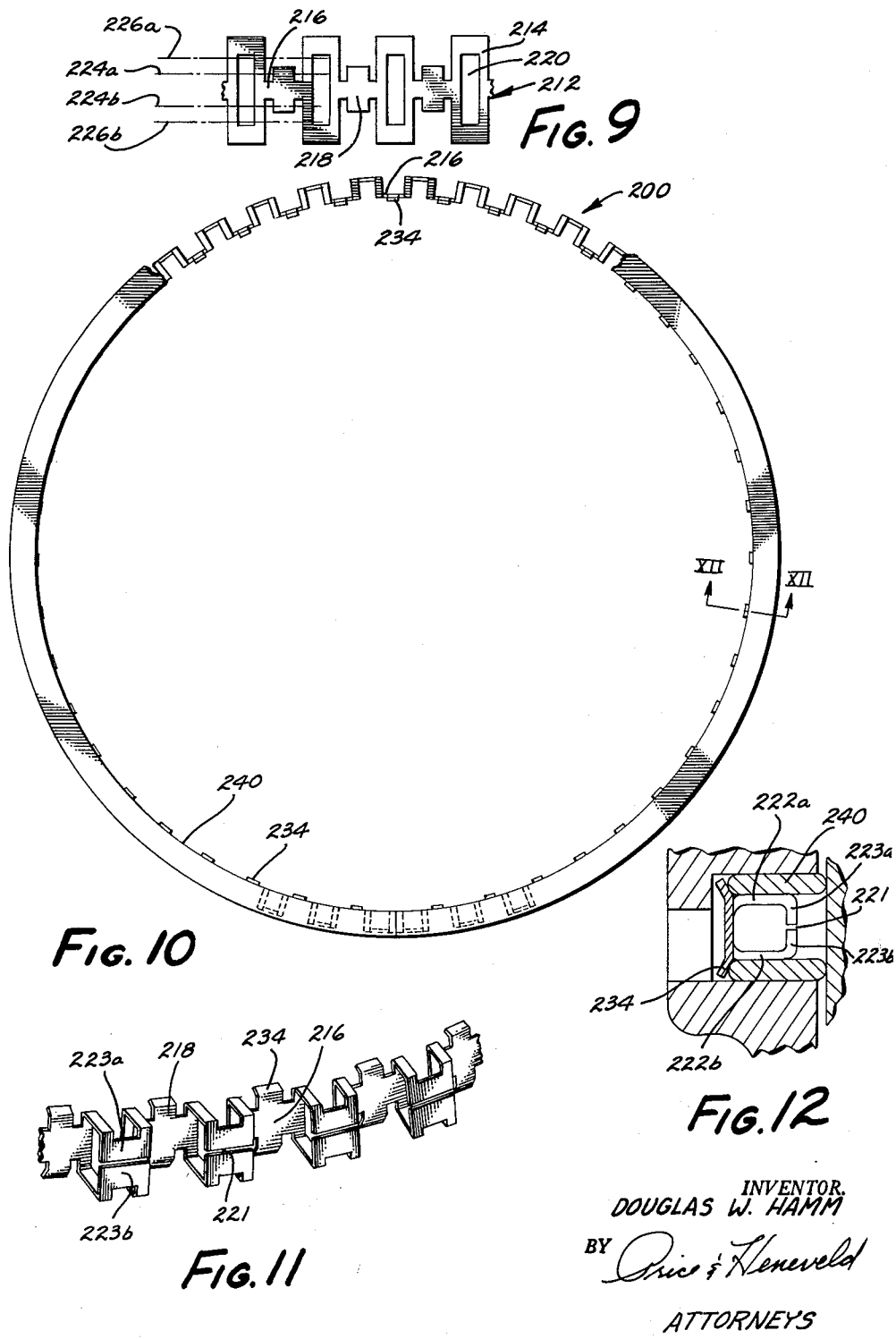

United States Patent Office 3,136,559
Patented June 9, 1964

3,136,559
PISTON RING SPACER
Douglas W. Hamm, Muskegon Heights, Mich., assignor to Muskegon Piston Ring Company, Muskegon, Mich., a corporation of Michigan
Filed Jan. 25, 1961, Ser. No. 84,881
7 Claims. (Cl. 277—139)

This invention relates generally to piston rings, and more particularly to the construction of a piston ring spacer to be utilized in piston rings comprised of a spacer and two adjacent rails.

With the advent of high compression automotive engines, various types of piston rings have been devised utilizing two spaced rails with a supporting spacer therebetween to cope with the varying pressures encountered with such engines. Although many of these spacers have met with substantial commercial success, the automotive industry has been constantly searching for a unique spacer capable of possessing in the same unit optimum amounts of (1) radial tension to cause the piston ring to seal tightly against the cylinder wall, (2) axial strength to prevent deformation and collapse of the spacer holding the rails in sealing engagement with the sides of the groove and (3) flexibility to facilitate conformation of the ring with the cylinder even though the latter may become out of round after substantial use.

Automotive assembly operations are also in need of a spacer with which costly, faulty assembly of the rails with the spacer by placement of one of the rails between the axial legs of the spacer rather than on the outer axial side of the legs would be entirely eliminated by making such impossible.

Therefore, it is an object of this invention to provide a piston ring spacer having a construction which causes the desirable but frequently conflicting characteristics of axial strength, segmental flexibility and radial tension to be mutually compatible and independently variable. Further objects of this invention are to provide a spacer which possesses great axial strength, increased flexibility, improved abutting ends on the split spacer, and which will assure proper placement of segment rings or rails in the assembly of the piston ring.

These and other objects will be apparent from a scrutiny of the specification when studied together with the drawings in which:

FIG. 1 is a fragmentary plan view of one embodiment of the piston ring spacer illustrated in flat pattern;

FIG. 2 is a plan view of the assembled piston ring with a portion of the top rail removed showing the first embodiment of the spacer;

FIG. 3 is a fragmentary perspective view of the spacer shown in FIG. 2;

FIG. 4 is a fragmentary sectional view taken along the plane IV—IV of FIG. 2 illustrating the ring seated in the ring groove of a cylinder;

FIG. 5 is a fragmentary plan view of a second embodiment of the novel spacer illustrated in flat pattern;

FIG. 6 is a plan view of an assembled piston ring with a portion of the top rail removed to expose the second embodiment of the spacer;

FIG. 7 is a fragmentary perspective view of the spacer shown in FIG. 6;

FIG. 8 is a fragmentary sectional view taken along the plane VIII—VIII of FIG. 6 illustrating the ring seated in a ring groove;

FIG. 9 is a fragmentary plan view of a third embodiment of the novel spacer illustrated in flat pattern;

FIG. 10 is a plan view of an assembled piston ring with a portion of the top rail removed to expose the third embodiment of the spacer;

FIG. 11 is a fragmentary perspective view of the spacer shown in FIG. 10; and

FIG. 12 is a fragmentary sectional view taken along the plane XII—XII of FIG. 10 illustrating the ring seated in a ring groove.

This invention basically utilizes in combination with a pair of split rails or ring segments, a split spacer-expander which consists of a plurality of circumferentially spaced generally rectilinear tubular members, the upper and lower sides of which form the rail seats of the spacer. Each of the tubular members is formed from a cross member or an elongated loop which is bent along four parallel bend lines arranged normal to the greater axis of the loop, whereby the opposite ends of the loop are brought into a close spaced relationship with each other, or optionally into abutting contact with each other, to form the tubular structure. These tubular members are joined together by webs which in one embodiment are arranged along the outer radial face of the spacer and in another embodiment are arranged along the inner radial face of the spacer. Variously spaced around the circumference of the spacer are rail engaging tangs. These are advantageously formed on the sides of the webs and have ends which extend axially beyond the rail seats to form the backing pads for the rails, whereby the radial tension of the spacer is imparted to the rails. In the embodiments of the spacer in which the webs are arranged along the inner radial face of the spacer, the tongues project generally axially from the webs. In the embodiment in which the webs are arranged along the outer radial face of the spacer, a portion of each of these tongues extends radially beneath the rails. In the embodiments shown the spacer has two radially facing bight portions, one consisting of the central portions of the loops together with the webs and the other consisting of the closely spaced ends, or the abutting ends, of the loops.

Embodiment #1

Referring now to FIGS. 1 and 2, the finished spacer 10 is depicted as formed from a blank 12. This blank is substantially flat and may be stamped from a piece of sheet metal by appropriate dies which form the integrated construction comprising cross members or loops 14, webs 16, and tangs or tongues 18. Each loop 14 possesses a central opening 20, and is preferably axially elongated in configuration. Each of the loops 14 is spaced an equal distance from its adjacent loops. The spaced loops are joined by webs 16 arranged along a line midway between the ends of the loops. Rail engaging tangs 18 around the spacer preferably are joined to and extend axially from these webs.

After this blank has been formed to give the configuration shown in FIG. 1, the ends of each loop are bent laterally along inner parallel bend lines 24a and 24b. This bending operation may be accomplished by suitable equipment in a manner well-known to those skilled in the art. Thereafter, the loops are bent axially and toward each other along outer parallel bend lines 26a and 26b so that the terminal edges 28a and 28b of loop ends 23a and 23b are in or almost in an abutting relationship as seen in FIG. 3. Thus, each of the loops forms the periphery of a box-type or tubular body member having open ends 30 as seen in FIG. 3.

In this embodiment of the spacer, the loops forming the box-type member are joined by webs having a short tang 18 extending from each side of the web. Since these webs and the adjacent central portions 32 of the loops form the inner diameter of the completed spacer shown in FIG. 2, the extremities 34 thereof are bent slightly radially inwardly at an obtuse angle with respect to the rest of the tang and the web, and in a direction away from the box-type members as shown in FIGS. 3 and 4. In the completed ring, therefore, these extremities 34 extend toward the central axis 36 around which all of the box-type members and the joining webs with their tangs are circumferentially spaced, i.e., around which they are centered and they face. When the elongated spacer member is forced into a circle around the central axis 36, ends 41 and 42 abut solidly to provide the needed radial tension. In the final circular shape of the spacer, ends 28a and 28b are positioned on the outer periphery of the spacer and form an outer bight portion, while the central portion 32 is on the inner periphery thereof and forms an inner bight portion along which webs 16 are arranged.

FIG. 4 illustrates the completed piston ring with the spacer 10 assembled to two segment rings or rails 40 in groove 43 of piston 44. The outer periphery 46 of the rails contacts and seals against the cylindrical surface 48 of a typical cylinder in an internal combustion engine.

Each of the rails 40 itself possesses a significant amount of radial tension and is characterized by the split construction well-known in the art. Thus, the radial tension of the rails is in effect supplemented by the radial tension of the spacer. As seen in FIG. 4, the bent extremities 34 of tangs 18 wedge rails 40 against the walls of the ring groove to hold the rails in a stable position, thereby effecting a continuous side seal between the rails and the sides of the ring groove. This wedging action helps the rails to maintain side sealing engagement with the ring groove during the rings reciprocatory motion.

The box-type structure of each of the indirectly connected loops constitutes a substantial and important advance in the field of piston ring spacers. The box form provides greatly increased axial strength in comparison to previous cantilever type structures where the rail supporting radial flanges were connected on only one side. The novel abutting relationship of the loop end prevents any appreciable axial deformation of the spacer due to large forces acting on the rails 40 to compress the ring axially. The strength of the spacer is therefore no longer dependent upon the strength of radial portions 22a and 22b and especially corners 25a and 25b for its entire resistance to axial forces as was the prior type of spacer. Rather, ends 23a and 23b resist axial forces tending to collapse the spacer by forming a girder member which becomes the fourth side of the tubular box. If the terminal edges 28a and 28b actually make abutting contact as the spacer is manufactured, then a girder or rigid cross section is formed which will have no deflection. However, if the terminal edges are slightly spaced, the spacer will have some degree of resilient deflection depending upon the width of the gap and the thickness of the material from which the spacer is manufactured. This deflection, however, will be accurately regulated by these factors which may be controlled during manufacture. The different type of stresses resulting with the box structure enables one to manufacture a spacer of significantly thinner material without sacrificing strength. This is possible since ends 23a and 23b very simply and effectively provide positive resistance to deformation or collapse of radial portions 22a and 22b which constitute the rail seats.

The novel construction also imparts increased radial segmental flexibility to the spacer. This increased flexibility is caused by the increased length of each loop whereby the ends thereof are axially rather than radially oriented. As a result, the longer lever arm extending from the inner diameter at the central portion 32 to the outer diameter of the spacer at the loop ends, terminates in flat loop ends which may flex readily. This is in contrast to the prior radially oriented loop ends wherein flexing was resisted by shear resistance of the loop ends since the ends actually constituted part of the rail seats 22a and 22b. As a consequence, the novel spacer readily conforms to the cylinder wall, even though the latter may be somewhat out-of-round. This improved segmental flexibility does not detract either from the axial strength of the unit, or from the over-all radial tension so necessary in a piston ring spacer.

This third characteristic of radial tension is also optimized in the novel spacer because of the solidly abutting ends 41 and 42. These tubular ends, preferably square in configuration, may be pressed together with substantial force due to the large area of contact formed therebetween. No tendency of the ends to telescope within each other exists as often occurred in the prior art structures.

The novel spacer construction not only provides greatly improved characteristics of axial strength, radial segmental flexibility, and radial tension, but also causes these desirable attributes to be compatible and substantially independently variable. This is true since these different properties are dependent upon different structural portions of the spacer. More specifically, the axial strength is due to the generally tubular configuration; the segmental flexibility is chiefly dependent upon the axial location of loop ends 23a and 23b; and the increased radial tension is due to firmly abutting split ends 41 and 42. The substantial independence of these characteristics contrasts with prior art structures wherein one property was generally improved at the expense of another.

*Embodiment #2*

FIGS. 5, 6, 7 and 8 depict the second embodiment of this invention utilizing the box or tubular type spacer construction but differing from the first embodiment in that the ends 123a and 123b of each loop 114 are on the internal diameter or peripheral surface of the finished spacer 100 as shown in FIG. 6. The connecting webs 116 are on the outer diameter in this embodiment. Tangs 118 are integral with connecting webs 116 and extend both axially and radially inwardly from both sides thereof. The extremities of the tangs 118 are bent axially outwardly so as to diverge with respect to each other, forming the rail engaging pads 134. These pads may be inclined slightly to create a wedging effect for maintaining the side seal between rail members 140 and the ring groove as explained with respect to the first embodiment. The flat pattern illustrated in FIG. 5 is formed into the completed spacer by bending operations using typical dies along the parallel bend lines 124a and 124b and 126a and 126b. The loops are bent radially along parallel bend lines 124a and 124b to form parallel portions or rail seats 122a and 122b, and bent along outer parallel bend lines 126a and 126b to form the axially extending ends 123a and 123b, thus creating a box-type body member. This box member is defined by central portion 132, parallel portions 122a and 122b and ends 123a and 123b. The box shaped body members thus formed have open faces 130, thus being essentially open end tubes. These tubes are circumferentially spaced around axis 136 to form spacer 100 with solidly abutting ends 141 and 142.

Rails 140 are placed on rail seats 122a and 122b of spacer 100 as shown in FIGS. 6 and 8 and the assembly is placed in ring groove 143 of piston 144 for insertion in cylinder 148 of an internal combustion engine. A seal is formed at 146 between the rails and cylinder wall and a side seal is maintained between the rail and the sides of the ring groove. This spacer construction possesses greatly increased axial strength and resistance against deformation of rail seats 122a and 122b and possesses the other advantages described in connection with the ring 10 in Embodiment #1.

*Embodiment #3*

FIGS. 9, 10, 11 and 12 depict the third embodiment of this invention utilizing the box or tubular type spacer construction, but differing from the first and second embodiments in that a small space 221 is allowed to remain between ends 223a and 223b. This spacer 200, formed from blank 212, is essentially very similar to the others including the plurality of box type or tubular elements formed from loops 214 with openings 220, interconnecting webs 216, tangs 218 and pads 234. Loops 214 are bent along parallel bend lines 224a 224b, 226a and 226b to place rail seats 222a and 222b in a parallel relationship, and to form the fourth side of the box with ends 223a and 223b.

These ends 223a and 223b are not normally in an actual abutting relationship in this embodiment since a small space or opening 221 remains therebetween. This space is smaller in width than the width of a conventional rail 240 used therewith. This prevents faulty assembly due to placement of the rail between the rail seats. The gap is also so small that these ends come into abutment under large axial forces, thereby forming a safety girder which prevents serious deformation or collapse of the spacer. It has been found that this construction effectively provides the independently variable attributes of resistance to axial deformation, radial tension and optimum flexibility for reasons explained heretofore with respect to embodiments one and two. Further, spacer 200 has been found to be readily adaptable to high speed forming operations since space 221 essentially provides a clearance to absorb varying forming machine and stock of tolerance deviations. This space is generally less than about 0.024 inch in width and thus constitutes a relatively small gap to close under high forces to safeguard against axial collapse of the spacer. Yet such a space is large enough to facilitate the manufacture of such a spacer on conventional forming machines.

It may readily be seen from a study of the illustrative material set forth that there is provided an improved piston ring spacer which renders the desirable characteristics of segmental flexibility, axial strength, and radial tension compatible and substantially independently variable so that each characteristic may be optimized rather than necessitating the sacrifice of one beneficial characteristic for an improvement in another. Also, there is provided a spacer that eliminates the expensive problem of improper assembly of rails on the spacer.

It should be noted that the ends of the loops which are brought either into close spaced relationship or into abutment with each other may possess various shapes other than the square or semi-circular ones depicted and that edges 28a and 28b may be altered to obtain the desired contact therebetween. Further, whether the pads 34 and 134 at the ends of the tangs which preferably extend from the webs are normal or inclined to the rail seats is a matter of choice, both constructions being conventional in the art.

It is recognized that various modifications of the spacer disclosed may be made without departing from the spirit of the invention. These modifications are deemed to be part of this invention, such invention being limited only by the definitions provided in the following claims and the equivalents thereto.

I claim:
1. A piston ring having a spacer and a pair of rails, said spacer comprising: a plurality of cross members joined together by webs arranged along a line midway between the ends of said cross members; each of said cross members being formed into a tubular member with opposite ends thereof being adjacent to each other and defining a gap therebetween of a width less than the thickness of one of said rails; said tubular member having a first pair of oppositely directed faces forming rail seats and a second pair of oppositely directed faces forming inner and outer bight portions; said webs being arranged along said inner bight portion and said ends of said cross members being arranged along said outer bight portion; means for engaging the inner radial edges of said rails.

2. A piston ring spacer comprising a plurality of circumferentially spaced body members each of substantially tubular cross-section; each of said body members having both a radially inner side and a radially outer side, said sides being joined to each other by a pair of axially spaced rail seats forming the others of said sides of each body member; the ends of said body members being open and oriented circumferentially of said spacer; one of said radially inner and outer sides of each of said members having a narrow opening extending the length thereof circumferentially of said spacer; and a plurality of webs joining said body members, said webs being arranged in the plane of one of said radially directed sides.

3. A piston ring spacer comprising: a plurality of cross members joined together by webs arranged along a line midway between the ends of said cross members; each of said cross members being formed into a tubular member with opposite ends thereof being adjacent to each other and defining a narrow gap therebetween; said tubular member having a first pair of oppositely directed faces forming rail seats and a second pair of oppositely directed faces forming inner and outer bight portions; said webs being arranged along one of said inner and outer bight portions and said ends of said cross members being arranged along the other of said inner and outer bight portions in a plane generally parallel to said webs; means for engaging the inner radial edges of said rails.

4. A piston ring spacer as described in claim 3, wherein said rail engaging means is a tang extending axially and oppositely from each of said webs.

5. A piston ring spacer as described in claim 3, wherein said webs are arranged along the inner radial bight portion of said spacer.

6. A piston ring spacer as described in claim 3, wherein said webs are arranged along the outer radial bight portion of said spacer.

7. A piston ring spacer as described in claim 3, wherein said cross members are each annuli elongated normal to said line along which they are joined to said webs.

References Cited in the file of this patent
UNITED STATES PATENTS

| | | |
|---|---|---|
| 2,293,699 | Engelhardt | Aug. 25, 1942 |
| 2,635,022 | Shirk | Apr. 14, 1953 |
| 3,024,029 | Brenneke | Mar. 6, 1962 |